United States Patent
Scheiter et al.

[11] Patent Number: 6,159,762
[45] Date of Patent: Dec. 12, 2000

[54] PROCESS FOR PRODUCING MICROMECHANICAL SENSORS

[76] Inventors: Thomas Scheiter, Flösserweg 13, D-82041 Oberhaching; Christofer Hierold, Dornröschenstr. 48, D-81739 München; Ulrich Näher, Rheinstr. 23, D-80803 München, all of Germany

[21] Appl. No.: 09/308,985

[22] PCT Filed: Nov. 24, 1997

[86] PCT No.: PCT/DE97/02751

§ 371 Date: May 27, 1999

§ 102(e) Date: May 27, 1999

[87] PCT Pub. No.: WO98/23935

PCT Pub. Date: Jun. 4, 1998

[30] Foreign Application Priority Data

Nov. 28, 1996 [DE] Germany .......................... 196 49 367

[51] Int. Cl.[7] .................................................. H01L 21/00
[52] U.S. Cl. ........................... 438/53; 438/52; 257/415; 361/283.4
[58] Field of Search ...................... 73/718, 724; 257/415; 361/283.1, 283.3, 283.4; 438/50, 52, 53

[56] References Cited

U.S. PATENT DOCUMENTS 5,095,401  3/1992  Zavracky et al. ................... 361/283.4
5,596,219  1/1997  Hierold .
5,760,455  6/1998  Hierold et al. .

FOREIGN PATENT DOCUMENTS 0 714 017 A1   5/1996   European Pat. Off. .
0 732 594 A1   9/1996   European Pat. Off. .
42 23 455 A1  10/1993   Germany .
44 18 207 C1   6/1995   Germany .

OTHER PUBLICATIONS

Howe, "Surface micromachining for microsensors and microactuators", J. Vac. Sci. Technol., 1988 American Vacuum Society, pp. 1809–1813.

Japanese abstracts, Publication No. 01013773, Publication Date Jan. 18, 1989.

*Primary Examiner*—Chandra Chaudhari
*Assistant Examiner*—K Christianson
*Attorney, Agent, or Firm*—Hill & Simpson

[57] ABSTRACT

Method for manufacturing an absolute pressure sensor as micromechanical component on a silicon substrate, whereby a cavity (4) is etched out in an auxiliary layer (3) under a membrane layer (5) through etching openings (6), the etching openings are closed with a passivation layer (7), whereby a specific etching opening (11) is re-opened in a via hole etching and this opening is re-closed with a metallization or dielectric material (10, 12) in a following process step that ensues at low pressure.

10 Claims, 2 Drawing Sheets

PROCESS FOR PRODUCING MICROMECHANICAL SENSORS

BACKGROUND OF THE INVENTION

1. Field of the Invention

The present invention is directed to a method for manufacturing micromechanical sensors, particularly absolute pressure sensors, that are preferably manufactured in the framework of a CMOS process and are arranged on a substrate as a micromechanical component.

2. Description of the Related Art

Capacitative pressure sensors are utilized for measuring absolute pressure. A closed chamber having a reference pressure is terminated by an elastic membrane that is exposed to an external pressure. The electrically conductive membrane, together with the side of this chamber that lies opposite, forms a plate capacitor. The membrane is deformed due to the pressure difference between the external pressure and the internal reference pressure. The capacitance of this capacitor changes due to the changed distance between the membrane and the backside of the chamber acting as a cooperating electrode that, for example, can be formed by a doped region produced in semiconductor material. The external pressure can be identified from this change in capacitance. Such an arrangement is disclosed, for example, by U.S. Pat. No. 5,095,401. One problem in the manufacture of such pressure sensors in the framework of a CMOS process derives in that, after the cavity provided under the membrane has been etched out, this cavity must be closed and the closure layer provided therefor is applied at a pressure of more than 10 mbar. The gas enclosed in the cavity therefore has too high a pressure, this having a negative influence on the sensitivity and temperature stability of the sensor. The relatively dense gas in the cavity heats too greatly given existing membrane oscillations and thereby falsifies the measured result. A corresponding difficulty occurs given encapsulated acceleration sensors wherein a moveable micromechanical mass part is arranged in a cavity that is closed off from the outside.

SUMMARY OF THE INVENTION

An object of the present invention is to provide a manufacturing method for a micromechanical sensor implementable in the framework of a CMOS processor wherein the aforementioned problem does not arise.

This object is achieved with the method comprising the steps:

a) a second layer or layer sequence is applied onto a first layer or layer sequence provided for the manufacture of cavity;

b) using a mask, recesses having a size dimensioned for the following steps c) and d) are produced in the second layer in the region of the projection of the cavity to be manufactured that is perpendicular relative to the layer planes;

c) upon employment of these recesses, a cavity is etched out in the first layer or layer sequence;

d) a closure layer is applied onto the second layer such that the recesses are closed without filling up the cavity;

e) at least one of the recesses in the second layer is re-opened at least to such an extent that the cavity is opened; and f) this recess is re-closed with a material that differs from the material of the closure layer, so that the cavity is closed.

An improvement of the method provides that the closure layer applied in step d) is composed of borophosphorous silicate glass. In step f, a metal sputtering and/or a deposition of a dielectric ensues. The step f is implemented such that a gas enclosed in the cavity thereafter resides under a pressure of at most 2000 $Nm^{-2}$ at room temperature.

Preferably, an electrically conductively doped region is produced at an upper side of a substrate of semiconductor material before step a and the first layer or layer sequence is produced thereover;

in step a, the second layer or layer sequence is produced at least partially electrically conductively; and in step e, via holes for electrical contacting of the second layer and of the doped region are simultaneously produced.

In step a, the second layer is applied as membrane layer for an absolute pressure sensor;

in step b, the recesses are arranged such that at least one of these recesses is present in a portion of the membrane layer that is not provided for forming a membrane; and in step e, a recess is selected that is located in a portion of the membrane layer that is not provided for forming a membrane.

The first layer of a preferred embodiment is applied as a layer sequence that contains a structured layer provided as mass part of an acceleration sensor; and step c is implemented such that this mass part is etched free in the cavity.

In the inventive method, the cavity is first closed with the closure layer, as provided. The cavity can, for example, be etched out through etching openings that have been produced in the membrane layer of an absolute pressure sensor or, respectively, in the encapsulation layer of an acceleration sensor. The layer of BPSG (borophosphorous silicate glass) which is provided as passivation and planarization layer for the CMOS components comes into consideration as a closure layer. After the closing, a gas having a pressure of more than 2000 $Nm^{-2}$ at room temperature is located in the cavity. Inventively, the cavity is re-opened in a later method step, this preferably occurring in that the closure layer is removed at one location and an etching hole in the membrane or a part of the membrane layer or, respectively, in the encapsulation layer situated therebelow and usually entirely or partially closed by the closure layer is re-opened. This opening is closed again in a method step that ensues under low pressure (less than 2000 $Nm^{-2}$), so that a vacuum or a gas under low pressure (less than 2000 $Nm^{-2}$ or, better, less than 1000 $Nm^{-2}$) is subsequently enclosed in the cavity. A material that is deposited at lower pressure than the material of the closure layer is employed for this purpose.

BRIEF DESCRIPTION OF THE DRAWINGS

A more detailed description of the inventive method follows with reference to FIGS. 1 through 4.

DETAILED DESCRIPTION OF THE PREFERRED EMBODIMENTS

Figure 1:
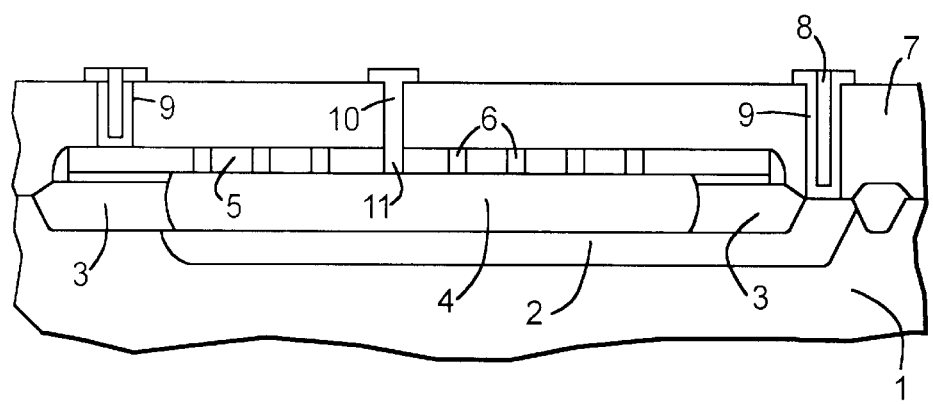
FIGS. 1 through 3 are side cross sectional views which show intermediate products of the pressure sensor given implementation of various embodiments of the in a plan view which method.

The inventive manufacturing method does not initially differ from a traditional VLSI very large scale integrated process, for example a CMOS (complementary metal oxide semiconductor) process, with which micromechanical sensors are also manufactured. For manufacturing an absolute pressure sensor, an auxiliary layer 3 is produced over a doped region 2 on a substrate 1 (see FIG. 1) that, for example, is silicon, being produced with local oxidation (LOCOS). A thin oxide layer, for example TEOS (tetraethylorthosilicate), is preferably applied onto the auxiliary layer 3 and the membrane layer 5 provided for the membrane is in turn applied on the thin oxide layer. Etching holes 6 are etched out in the membrane layer. Upon employment of these etching holes, a suitable etchant that, for example, can be HF in aqueous solution given an auxiliary layer of oxide, the cavity 4 is etched out. A subsequent surface-like passivation that is also provided for electronic components that are manufactured on the substrate is subsequently applied, for example of BPSG. Via holes 8 are then etched out in this passivation layer 7.

The inventive method differs from traditional method executions in that at least one corresponding opening 11 via an etching opening 6 closed by the passivation layer is also manufactured in the membrane layer 5 in this method step of via hole etching. A sputtering of metal that is provided as fill of the via holes and/or as a first metal layer for electrical connection preferably subsequently ensues. This method step typically ensues at a pressure of approximately 3 mTorr, approximately 0.4 N/m² and at a temperature of approximately 150° C. The internal pressure deriving in the cavity 4 is maintained therein when the specific etching opening 11 in the membrane through which the cavity 4 was opened is closed with the sputtering of the metal. The structure that is shown in FIG. 1 then derives, having a cavity 4 that is re-closed by a via hole fill 10 and sealed and having via hole fills 9 for electrical connection of the conductively fashioned membrane layer 5 and of the doped region 2. In this embodiment of the method, the opening in the passivation layer 7 over the etching opening 11 is to be produced with a smaller diameter then the other via holes 8. The diameter of the specific opening in the passivation layer 7 can, in particular, be smaller then the diameter of the re-opened etching opening 11. For the sake of simplicity, both of these dimensions are shown in the Figure as being of the same size. Given employment of specific metals, the opening over the etching hole 11 must be manufactured extremely small so that one succeeds in re-closing the cavity 4 with the metal. Given metals having extremely good edge coverage such as, for example, aluminum, the appertaining via hole, given a metallization thickness of, for example, 800 nm usually utilized in the process, must be produced clearly smaller then the etching holes 6 and the via holes 8. It can then occur that the cavity 4 is not opened when etching this hole having a very small diameter. There is therefore the risk that the desired result will not be achieved given this embodiment of the method.

Figure 2:
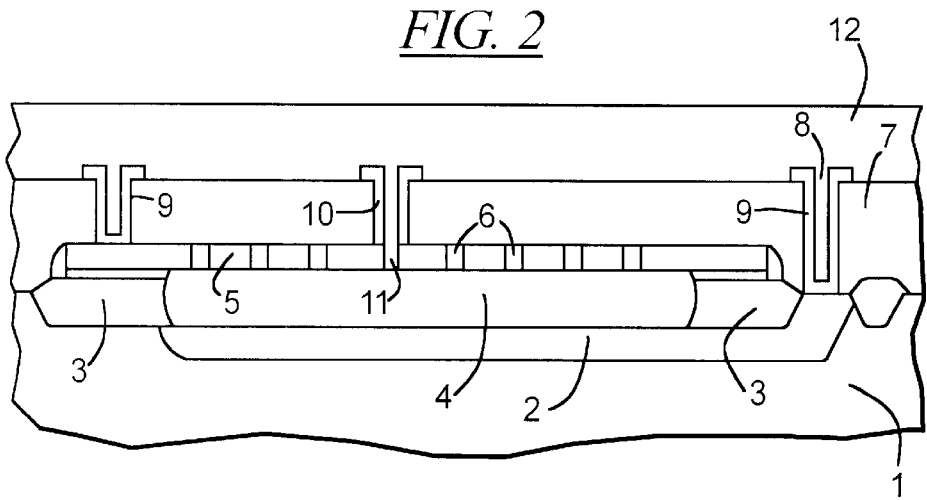

As an alternative to the above-described exemplary embodiment, a large via hole can be opened in the passivation layer 7—according to FIG. 2—over a specific etching opening 11 via which the cavity 4 is to be made accessible again to the outside. Corresponding to the cross-section shown in FIG. 2, the metal layer 10 sputtered into this opening does not close the etching opening 11. The cavity 4 thus initially remains opened toward the outside. After the structuring of the metal that has been sputtered on, a deposition of further layers ensues, these being provided as an intermediate dielectric (IMOX) between the various metallization levels. The first of these oxide layers 12 is applied surface-wide and closes the etching opening 11 and, thus, the cavity. A typical pressure in this method step is approximately 2.95 Torr, approximately 400 N/m² at approximately 300° C. The internal pressure deriving in the cavity 4 after the closing is roughly half as great at room temperature. In both versions of the inventive method, the pressure in the cavity after the re-closing is lower then 2000 N/m². The pressure of the cavity can be even be reduced to approximately 0.3 N/m² with the first of the described embodiments.

Figure 3:
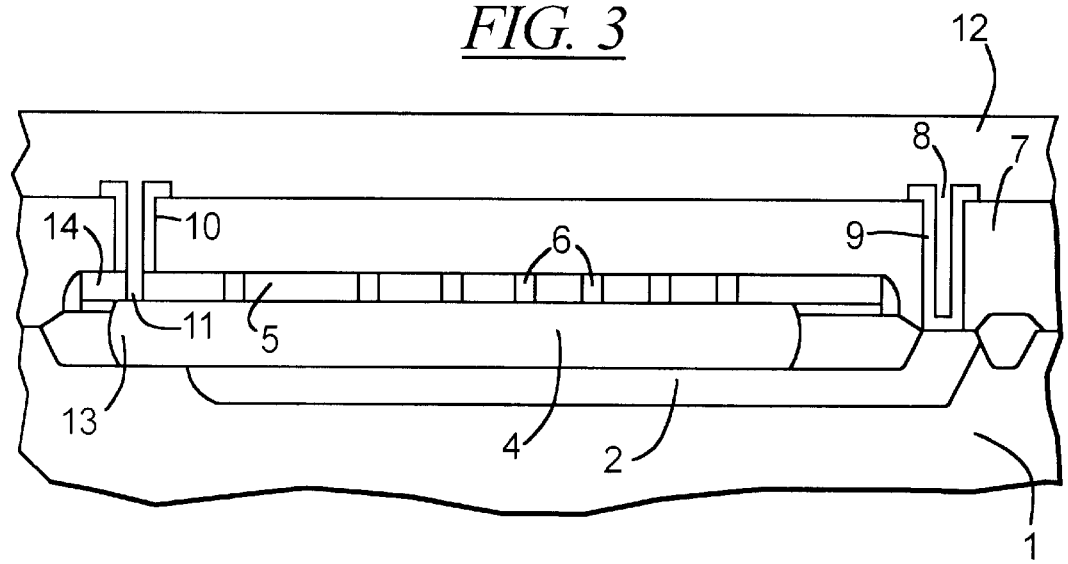
Figure 4:
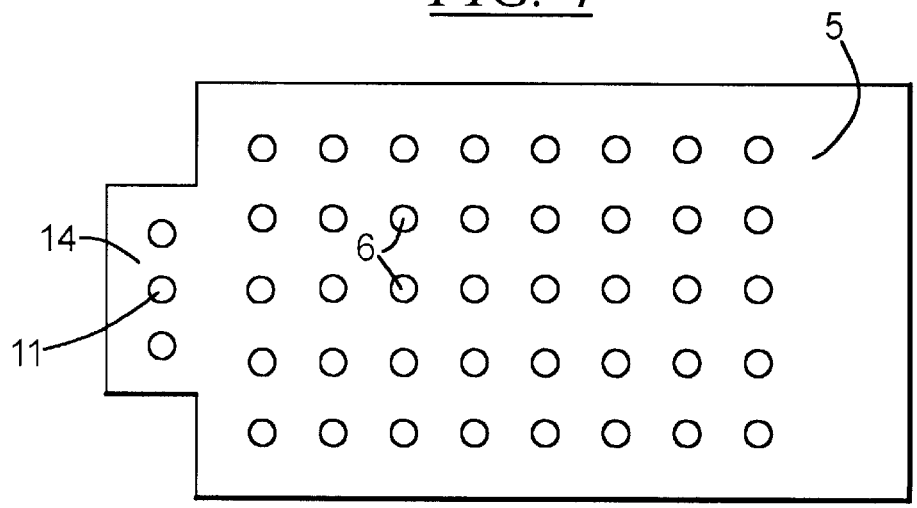
FIG. 4 shows the arrangement of the etching holes in the membrane layer given the embodiment of FIG. 3.

The embodiment according to FIG. 3 provides that an etching opening outside the portion of the membrane layer provided for the membrane be provided as an etching opening 11 to be re-opened. The arrangement of the etching openings 6 in the membrane layer 5 can, for example, be undertaken as shown in plan view in FIG. 4. The larger, rectangular part of the membrane layer forms the portion provided for the membrane, whereas a lateral projection 14 comprises three specific etching holes 11 in this example. A lateral channel 13 of the cavity 4 located thereunder is etched through these specific etching holes 11. As described, the passivation layer 7 is then applied for closing the membrane layer 5. The material of the passivation layer over the lateral etching holes 11 is also removed with the via holes 8. Dependent on the size of the etched opening, the etching opening 11 is closed when sputtering the metal layer or when applying the dielectric layer 12. A dimension of the opening corresponding to the exemplary embodiment of FIG. 2 is entered in FIG. 3. The arrangement of the additional etching openings 11 can be basically arbitrarily selected. The membrane layer can also be applied completely rectangularly; lateral channels 13 in the cavity 4 for the subsequent opening can also be produced at a plurality of sides. The only thing that is thereby critical is that the additional etching opening or the additional etching openings are produced outside the portion of the membrane layer provided for the membrane. This has the advantage that the membrane itself need not be re-opened after being finished and after being closed. A greater uniformity in the manufacture of the membrane layer can thus be achieved, and possible, subsequent damage to the membrane can be avoided.

Critical steps of the inventive method can also be implemented in the manufacture of an encapsulated acceleration sensor. An acceleration sensor comprises a micromechanical mass part that is suspended at resilient stays, so that it is deflected given the influence of an inertial force. This movement is detected and, thus, the acceleration producing the inertial force is measured. For protecting the moveable part, such acceleration sensors are preferably covered in protecting fashion with a cover layer or an encapsulation layer at that side facing away from the substrate. This encapsulation layer is preferably applied before the moveable part is etched free. Etching openings are produced in the encapsulation layer, and the material surrounding the moveable part, which has only been applied as an expedient, is removed through these etching openings. The moveable part is etched free in this way and a cavity arises between the substrate or a semiconductor layer and the encapsulation layer. The etching openings in the encapsulation layer are subsequently closed with a closure layer, so that the etched cavity is closed off from the outside. Given integration of the method in a CMOS process, the encapsulation layer can be manufactured in a relatively early method step and, for example, can be applied of polysilicon. The etching openings in this layer are then preferably closed with the planarization layer that is applied for a planarization and passivation of the semiconductor layer containing the electronic components. Here, too, BPSG preferably comes into consideration. The problem therefore also derives here that the closure layer is applied at extremely high pressure, which subsequently deteriorates the mobility of the mass part in the cavity. In conformity with the exemplary embodiments of the method already set forth, at least one of the etching openings that have already been provided is re-opened in the encapsulation layer in the case of the acceleration sensor; here, too, this can occur best together with the via hole etching for electrical connection. This via hole is closed in a following step that ensues at low pressure (less then 2000 $Nm^{-2}$ or, better, less than 1000 $Nm^{-2}$). In this example, too, the etching opening can be closed by an applied metal that is provided as a via hole fill or by a subsequently deposited dielectric, dependent on the size of the etched opening and on the nature of the deposited material. The same sequence as in the case of the pressure sensor fundamentally derives for the steps that are critical to the invention. Given an acceleration sensor, the movable mass part would be located in the cavity 4 entered in FIGS. 1 through 3 and the terminal 9 of the layer 5 can be omitted. The layer 5 then forms the encapsulation layer. The somewhat greater outlay given the embodiment of FIG. 3 with additionally laterally arranged etching openings is not required in the manufacture of an encapsulated acceleration sensor since the encapsulation layer does not make demands of constant manufacturing quality that are as stringent as the membrane layer of a pressure sensor. The inventive method therefore also represents a critical improvement in the manufacture of encapsulated acceleration sensors when the closure layer is to be applied under a high probess pressure.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for manufacturing a micromechanical sensor, comprising the following steps:
   a) applying a second layer onto a first layer provided for manufacture of a cavity;
   b) using a mask, producing recesses having a size dimensioned for following steps c) and d) in the second layer in a region of a projection of the cavity to be manufactured that is perpendicular relative to layer planes of the first and second layers;
   c) upon employment of the recesses, etching a cavity out in the first layer;
   d) applying a closure layer onto the second layer such that the recesses are closed without filling up the cavity;
   e) re-opening at least one of the recesses in the second layer at least to such an extent that the cavity is opened; and
   f) re-closing the at least one recess with a material that differs from a material of the closure layer so that the cavity is closed.

2. A method according to claim 1, wherein the closure layer applied in step d) is composed of borophosphorous silicate glass.

3. A method according to claim 1, wherein, in step f, said re-closing is by a metal sputtering.

4. A method according to claim 1, wherein the steps f includes enclosing a gas in the cavity thereafter resides under a pressure of at most 2000 $Nm^{-2}$ at room temperature.

5. A method according to claim 1, further comprising the steps of:
   aa) producing an electrically conductively doped region at an upper side of a substrate of semiconductor material before step a and producing the first layer over the electrically conductively doped region;
   a2) in step a, the second layer is at least partially electrically conductively; and
   e1) in step e, simultaneously producing via holes for electrical contacting of the second layer as said re-opening step is performed.

6. A method according to claim 1, wherein
   in step a, the second layer includes a first portion which is a membrane layer for an absolute pressure sensor and a second portion distinct from the membrane layer;
   in step b, producing at least one of the recesses in the second portion; and
   in step e, the at least one recess which is re-opened is in the second portion.

7. A method according to claim 1, further comprising the steps of:
   applying the first layer as a layer sequence that contains a structured layer provided as a mass part of an acceleration sensor; and
   in step c, the etching is implemented such that the mass part is etched free in the cavity.

8. A method according to claim 1, wherein, in step f, said re-closing is by a deposition of a dielectric.

9. A method as claimed in claim 1, wherein said first layer is a layer sequence.

10. A method as claimed in claim 1, wherein said second layer is a layer sequence.

* * * * *